US 6,742,397 B2

(12) United States Patent
Parker

(10) Patent No.: US 6,742,397 B2
(45) Date of Patent: Jun. 1, 2004

(54) HIGH PRESSURE SENSOR WITH SEPARATE PRESSURE PORT AND HOUSING AND METHOD FOR MAKING THE SAME

(75) Inventor: Gregory D. Parker, Charlotte, NC (US)

(73) Assignee: Invensys Sensor Systems, Shelby, NC (US)

( * ) Notice: Subject to any disclaimer, the term of this patent is extended or adjusted under 35 U.S.C. 154(b) by 0 days.

(21) Appl. No.: 10/156,095

(22) Filed: May 29, 2002

(65) Prior Publication Data

US 2002/0184955 A1 Dec. 12, 2002

Related U.S. Application Data

(60) Provisional application No. 60/296,441, filed on Jun. 8, 2001.

(51) Int. Cl.[7] .............................................. G01L 7/00
(52) U.S. Cl. ............................ 73/756; 73/715; 73/727; 277/300
(58) Field of Search .......................... 73/715, 756, 727; 277/300, 375, 377, 380, 382, 386, 387, 401; 285/86, 89

(56) References Cited

U.S. PATENT DOCUMENTS

| 2,390,103 | A | * | 12/1945 | Johnson ........................ 285/89 |
| 3,899,766 | A | | 8/1975 | Mermelstein et al. |
| 4,927,188 | A | * | 5/1990 | Sands ........................... 285/89 |
| 5,131,690 | A | * | 7/1992 | Mano ........................... 285/92 |
| 5,186,501 | A | * | 2/1993 | Mano ........................... 285/89 |
| 5,472,058 | A | * | 12/1995 | Hooper et al. ............... 175/371 |
| 5,902,478 | A | * | 5/1999 | O'Ryan ........................ 210/232 |
| 5,944,190 | A | * | 8/1999 | Edelen ..................... 206/524.4 |
| 6,050,147 | A | | 4/2000 | Viduya et al. |
| 2002/0073533 | A1 | * | 6/2002 | Park ............................. 29/613 |

FOREIGN PATENT DOCUMENTS

EP 0 352 240 A1 1/1990

* cited by examiner

Primary Examiner—Charles H. Nolan, Jr.
Assistant Examiner—Marissa Ferguson
(74) Attorney, Agent, or Firm—McDermott, Will & Emery

(57) ABSTRACT

A high pressure sensor is provided with a single-piece pressure port machined from stainless steel and has no internal gaskets or seals. A housing surrounds the pressure port along a portion of its axial length. The housing and pressure port have mating configurations that prevent axial rotation when the pressure port is inserted into the assembled position in the housing. A retaining ring locks the pressure port axially with respect to the housing and is fixed in place by a fixative, such as epoxy.

32 Claims, 2 Drawing Sheets

HIGH PRESSURE SENSOR WITH SEPARATE PRESSURE PORT AND HOUSING AND METHOD FOR MAKING THE SAME

RELATED APPLICATION

This application claims priority from Provisional Application Serial No. 60/296,441 filed on Jun. 8, 2001 entitled: "A HIGH PRESSURE SENSOR WITH SEPARATED PRESSURE PORT AND HOUSING AND METHOD FOR MAKING THE SAME", the entire disclosure of which is hereby incorporated by reference herein.

FIELD OF THE INVENTION

The present invention relates to a high pressure sensor having a pressure port that is separate from the housing.

BACKGROUND OF THE INVENTION

High pressure sensors have found utility in a number of different applications. For example, high pressure sensors are often employed in the area of automotive controls to obtain a measurement of certain pressure parameters such as engine oil pressure, transmission fluid pressure or brake pressure. High pressure applications generally utilize an integral stainless steel housing and pressure port which attaches to the pressure vessel by a threaded fitting, for example.

One of the problems of an integral housing made of high strength stainless steel is that these pressure sensors are very expensive and difficult to machine. For example, the pressure sensors may have housing installation sizes (hexagonal shape) that range from 24 mm–27 mm from flat to flat. However, the pressure ports of these pressure sensors may be in the 12 mm diameter range. Current technology achieves this reduction in size with an integrated single pressure port/housing part. To form the integrated pressure port/housing, the part is made from 24 to 27 mm hex stock that is machined down to 12 mm diameter in the port section. As mentioned above, the high strength stainless steel that the pressure sensors are made from is expensive and very difficult to machine. However, it is one of the few materials that is acceptable for the application due to the material strength required to deal with the stresses induced by system pressures reaching 3,000 bars, for example.

The machining from 24 mm to 27 mm hex down to a 12 mm diameter at the port involves a lot of machine time and tool wear. Furthermore, the machining creates a large amount of wasted scrap material, and hence, wastes expensive material.

SUMMARY OF THE INVENTION

There is a need for a high pressure sensor that reduces the cost of manufacture, but creates a mechanically sound high pressure sensor.

These and other needs are met by embodiments of the present invention which provide a pressure sensor comprising a pressure port having first and second ends and a fluid chamber extending through the pressure port with an opening at a pressure inlet at the second end of the pressure port and terminating at a diaphragm at the first end of the pressure port. The pressure sensor also comprises a housing having a central opening that surrounds the outer circumference of the pressure port along only a portion of the axial length of the pressure port. A retaining element is provided between the housing and pressure port and axially locks the pressure port relative to the housing. A fixative covers the retaining element to lock the retaining element in place. The pressure port has a first section with a non-circular outer circumference configured to mate with the inner circumference of a first section of the central opening of the housing to prevent relative rotation between the pressure port and the housing.

The earlier stated needs are also met by embodiments of the present invention which provide a high pressure sensor comprising a single-piece machined pressure port with a fluid chamber having a fluid inlet at a first end, and a housing surrounding a portion of the pressure port and mechanically coupled to the pressure port such that the pressure port is rotationally and axially locked with respect to the housing.

The provision of a pressure port and a housing surrounding a portion of the pressure port allows the pressure port and housing to be separately manufactured. In a high pressure sensor, exposed to pressures greater than 10,000 psi, a high-grade material is required for the pressure port. However, the present invention avoids the machining of a single-piece housing and integral pressure port from a relatively large-diameter hex stock. In other words, assuming that the housing is required to have a diameter between about 24 mm to 27 mm and the pressure port is required to have a diameter of approximately 12 mm, the prior art integral high pressure sensor is machined from 24 to 27 mm hex stock. The machining of the pressure port down to 12 mm diameter is difficult to achieve and creates a lot of expensive wasted scrap material. Furthermore, the extensive machining involves excessive machine time and tool wear. By contrast, with the present invention, only the smaller diameter pressure port is machined. This allows the pressure port to be machined from a smaller, less expensive 16 mm diameter cylinder, rather than an equivalent length of 24 to 27 mm hex stock. The amount of scrap material is greatly reduced. Furthermore, the present invention allows the housing of the pressure sensor to be manufactured from a less expensive material than that of the pressure port, and one that is also easier to machine.

The earlier stated needs are also met by embodiments of the present invention which provide a method of forming a high pressure sensor comprising the steps of forming a pressure port by machining the pressure port from high strength material stock. A separate housing is formed from a lower strength material, this housing having a central opening. The pressure port is inserted through the central opening of the housing with a first section of the pressure port remaining within the central opening and a second section of the pressure port extending externally from the central opening and the housing. The pressure port is then rotationally and axially locked to the housing.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to high pressure sensors, including those of reducing costs to the manufacturer, while creating a mechanically sound method of integrating a separate pressure port and housing in a sensor. These are achieved, in the present invention, by the formation of a pressure port machined from relatively smaller diameter stock. The pressure port has no internal gaskets or O-rings. In certain embodiments, the end of the pressure port terminates at a diaphragm that is integral with the pressure port. Fluid is therefore prevented from entering inside of the housing which surrounds and securely holds a portion of the pressure port. Through mechanical coupling, and configuration of the housing and the pressure port, excessive rotation between the port and the housing during high torque installations is prevented. Furthermore, excessive movement on the longitudinal axis between the pressure port and the housing is prevented by the mechanical coupling.

Figure 1:
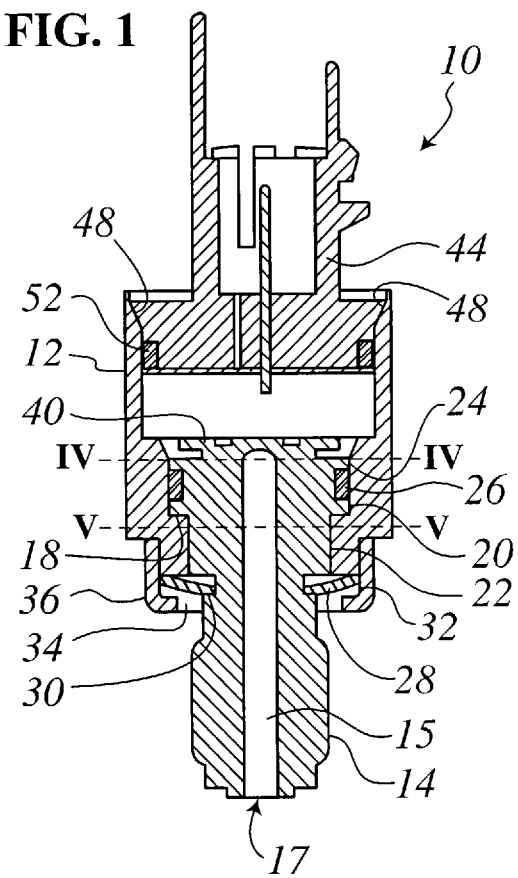
FIG. 1 is a cross-section of a pressure sensor constructed in accordance with embodiments of the present invention, but without the associated electronic components depicted for illustrative purposes.

Referring to FIG. 1, the high pressure sensor 10 is depicted with a housing 12 and pressure port 14 in an assembled state. For purposes of illustration, the electronic components are not depicted in FIG. 1. The pressure port 14, which may be machined from a relatively small diameter cylinder of a suitable material such as high strength stainless steel, has a fluid chamber 15 extending through most of the pressure port 14. The fluid chamber 15 opens at a fluid inlet 17. The fluid chamber 15 can be made by drilling a borehole (e.g. a 3 mm bore hole, when the diameter of the pressure port is approximately 12 mm). The fluid chamber 15 extends, in certain embodiments of the invention, through most of the pressure port 14 but terminates at a diaphragm 40. In the exemplary embodiment of the present invention depicted in FIG. 1, the diaphragm 40 is integral to the pressure port 14. This has a number of advantages, including avoiding the steps of securing a diaphragm to the pressure port, and ensuring that leaks from the pressure sensor into the housing do not occur. As an example, the diaphragm may be approximately 1 mm thick, although other thicknesses may be employed.

Figure 3:
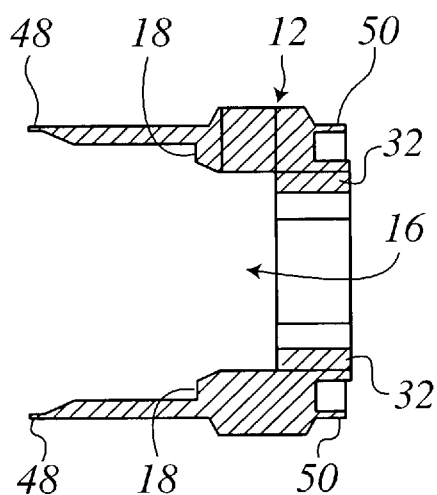
FIG. 3 is a cross-section of a housing constructed in accordance with embodiments of the present invention.

The pressure port 14 is inserted through a central opening 16 (see FIG. 3) of the housing 12 into the position shown in FIG. 1, during assembly. The housing 12 has a housing shoulder 18 against which an O-ring gland ledge 20 of the port 14 abuts in the assembled position. This limits the movement of the pressure port 14 relative to the housing 12 in the downward axial direction depicted in FIG. 1.

Figure 6:
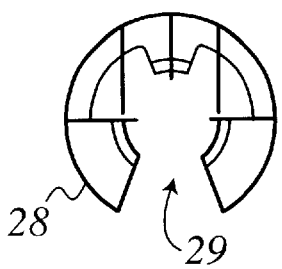
FIG. 6 is a top view of a retaining ring constructed in accordance with an embodiment of the present invention.

After the pressure port 14 is inserted through the central housing 12, with the O-ring gland ledge 20 abutting against the housing shoulder 18, a retaining ring 28 is placed around the pressure port 14 and extends into mating slots 30 of the pressure port 14. Retaining ring 28 also bears against ends 32 of the housing 12. The retaining ring 28 is flexed and biases the pressure port 14 (in a downward direction in FIG. 1) to lock the pressure port 14 with respect to the housing 12 in axial direction. A top view of an embodiment of the retaining ring 28 is depicted in FIG. 6. The retaining ring 28 has an opening 29 in its circumference that allows the retaining ring 28 to be slipped around the circumference of the pressure port 14.

Once the retaining ring 28 has been placed on the pressure port 14, further securement is ensured by the placement of a plastic retaining ring protector 36 over the retaining ring 28. The retaining ring protector 36 is press-fit onto the housing 12. The retaining ring protector 36 ensures that the end user cannot displace the retaining ring 28 from its installed position without causing visible damage. A fixative such as epoxy 34, is inserted into the space created by the retaining ring protector 36 and the housing 12, and secures the retaining ring protector 36 in place. This epoxy 34 fills all the space around the retaining ring 28. The epoxy 34, or other fixative, prevents relative motion and fretting between the retaining ring 28 and the housing 12 under heavy (e.g. 50 Grms) levels of vibration. Hence, the epoxy 34 provides long-term reliability of the system. The epoxy 34 prevents the retaining ring 28 from rubbing material off of the face of the housing 12. Such wear could possibly cause "slop" in the system after periods of heavy vibration. This slop eventually wears down the O-ring leading to water intrusion to the electronics of the sensor 10 inside the housing 12. Fluid sealing is further enhanced by an O-ring 26 that is provided between the O-ring gland 20 of the pressure port and the O-ring gland in the housing 12.

In alternative embodiment (not shown), the retaining ring protector is inserted into a mating gland in the housing 12 and secured in place by crimps that are deformed over the retaining ring protector 36. The epoxy 34 provides additional securement in this embodiment.

Figure 4:
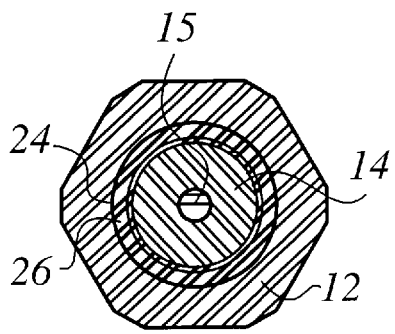
FIG. 4 is a cross-section of the assembled pressure sensor, taken along line IV—IV in FIG. 1.
Figure 5:
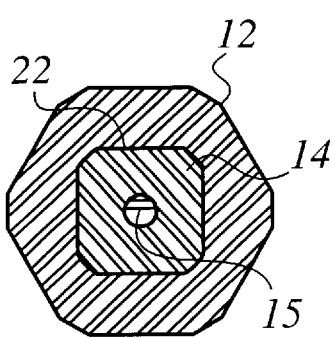
FIG. 5 is a cross-section of another portion of the assembled pressure sensor in accordance with an embodiment of the present invention, taken along line V—V in FIG. 1.

In addition to the axial locking of the housing 12 and the pressure port 14 provided by the mechanical coupling of the retaining ring 28, the pressure port 14 and housing 12 are configured to prevent relative rotation during high-torque installations. Hence, at least a section of the pressure port 14 has an outer circumference that is a non-circular shape. This first section 22 of the pressure port 14 matches the shape of the inner circumference of the housing 12 in that region. Hence, as depicted in FIG. 5, the pressure port 14 has an approximately square configuration in the first section 22 in an exemplary embodiment. Likewise, the inner circumference of the housing 12 also has an approximately square configuration. Other shapes are contemplated by the invention. These mating configurations, and their non-circular shapes prevent relative rotation between the pressure port 14 and housing 12. Other sections of the pressure port 14 may remain in a circular shape, such as second section 24. A cross-section of the circular section of the housing 12 and the pressure port 14, including the O-ring 26, is depicted in FIG. 4.

A connector 44 is provided in the housing 12 and is sealed with O-ring 52 located between connector 44 and the housing 12. The connector 44 provides the connections between the electronics inside sensor 10 to electronic components outside the sensor 10. The connector 44 is secured to the housing 12 by clamps 48 (shown in an uncrimped position in FIG. 1) that are crimped over the shoulders of connector 44. The plastic retaining ring 36 is press-fit in position on the housing 12.

Figure 2:
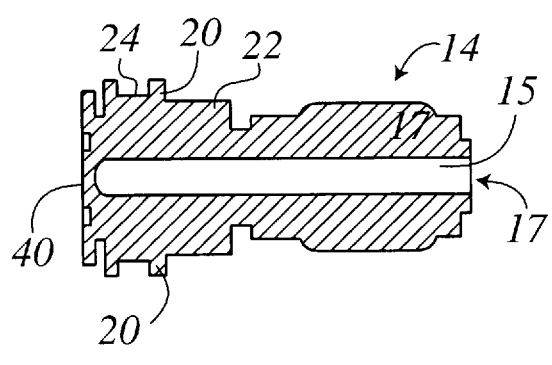
FIG. 2 is a cross-section of a pressure port constructed in accordance with an embodiment of the present invention.

The pressure port 14 in isolation is depicted in cross-section in FIG. 2. Similarly, the housing 12 in isolation is depicted in cross-section in FIG. 3. Since the housing 12 is not integrally formed from the same piece of material as the pressure port 14, the housing 12 may be made of less expensive material than stainless steel, such as aluminum or other suitable material.

Figure 7:
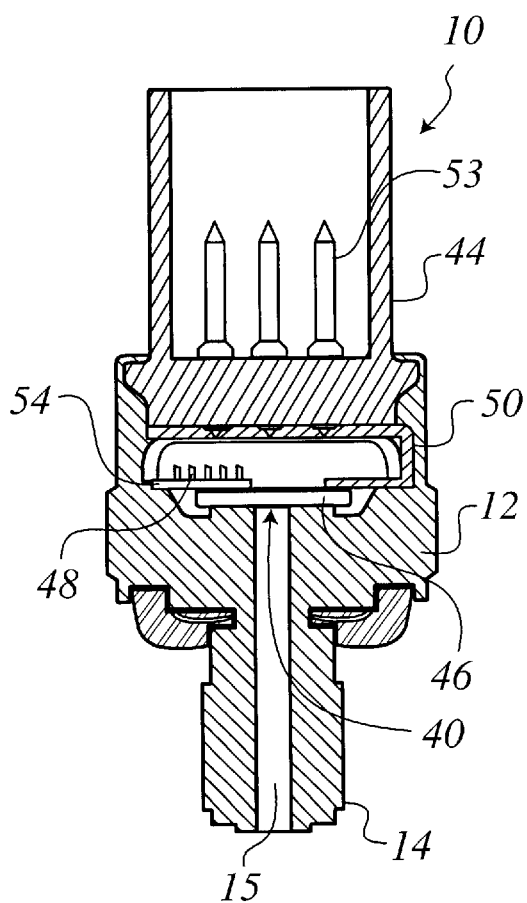
FIG. 7 is a schematic cross-section depicting the assembled pressure sensor with electronics in accordance with embodiments of the present invention.

In the assembled pressure sensor 10 as depicted in FIG. 7, a piezoresistive die 46 is provided on the diaphragm 40 and contains conventional strain gages that sense the diaphragm stress. An ASIC 48 is provided and is connected with the piezoresistive die 46 to a two-lobed flexible circuit 50. In turn, the flexible circuit 50 is connected to connector pins 53 which serve to connect the electronics within the housing 12 to external components that receive and interpret the sensor signals. A plastic wire bond cover 54 covers the wire bonding within the housing 12.

One of the advantages of the pressure port 14 is the lack of O-rings or gaskets in the pressure inlet 17 leading to the diaphragm 40. This helps to ensure the sealing of the inside of the housing 12 from the environment, and is especially important in light of the very high pressures, such as 10,000 to 30,000 psi, or greater, that the high pressure sensor 10 may be exposed to.

The present invention provides a multi-piece sensor that reduces the cost of manufacture by machining only the pressure port from high-grade expensive materials. However, the invention ensures that the high pressure sensor has mechanically sound integration of the pressure port and the housing so as to not permit excessive rotation between the court and the housing during high (e.g. 50 Nm) torque installations. The inside of the housing is sealed from the environment with the present invention. Excessive movement along the longitudinal axis is also prevented during installation, handling or strong vibrations.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A high pressure sensor comprising:
    a single-piece machined pressure port with a fluid chamber having a fluid inlet at a first end;
    a housing surrounding a portion of the pressure port; and
    a biasing element between the pressure port and the housing that axially locks the pressure port with respect to the housing, the housing being further mechanically coupled to the pressure port such that the pressure port is also rotationally locked with respect to the housing.

2. The high pressure sensor of claim 1, wherein the pressure port has an integral diaphragm formed at a second end of the fluid chamber.

3. The high pressure sensor of claim 2, wherein the housing has a central opening through which the pressure port extends, with a first section of the pressure port retained within the housing, and a second section extending from the central opening out of the housing.

4. The high pressure sensor of claim 3, wherein the first section of the pressure port has a non-circular outer circumference and a first section of the central opening of the housing has a mating inner circumference configured to closely fit around the first section of the pressure port to thereby rotationally lock the pressure port with respect to the housing.

5. The high pressure sensor of claim 4, wherein the second section of the pressure port has a circular outer circumference.

6. The high pressure sensor of claim 1, wherein the pressure port is made of high strength stainless steel.

7. The high pressure sensor of claim 6, wherein the housing is made of a material that is lower strength than stainless steel.

8. The high pressure sensor of claim 7, wherein the housing is made of aluminum.

9. The high pressure sensor of claim 8, wherein the pressure port includes a shoulder, the housing has a first end, and the biasing element is a flexed retaining ring that bears on the shoulder of the pressure port and the first end of the housing.

10. The high pressure sensor of claim 9, further comprising a retaining ring protector connected to the housing and substantially enclosing the retaining ring in a space formed by the retaining ring protector and the housing.

11. The high pressure sensor of claim 10, further comprising fixative that fills the space to prevent relative motion between the retaining ring and the housing.

12. The high pressure sensor of claim 11, wherein the fixative is epoxy.

13. The high pressure sensor of claim 11, further comprising a connector attached to a second end of the housing and forming a space enclosed by the connector and the housing.

14. The high pressure sensor of claim 13, further comprising sensor electronics within the space enclosed by the connector and the housing, the connector providing connections between the sensor electronics and electronic components external to the high pressure sensor.

15. The high pressure sensor of claim 14, wherein the sensor electronics include a piezoresistive die on the diaphragm that senses diaphragm stress.

16. The high pressure sensor of claim 15, further comprising flexible sealing elements between the outer circumference of the first section of the pressure port and the inner circumference of the first section of the central opening of the housing, and between the inner circumference of the central opening of the housing and an outer circumference of the connector.

17. A pressure sensor comprising:
    a pressure port having first and second ends and a fluid chamber extending through the pressure port and opening at a pressure inlet at the second end of the pressure port and terminating at an integral diaphragm at the first end of the pressure port;
    a housing having a central opening that surrounds the outer circumference of the pressure port along only a portion of the axial length of the pressure port;
    an axially-biasing retaining element between the housing and pressure port that axially locks the pressure port relative to the housing; and
    a fixative that covers the retaining element to lock the retaining element in place;
    wherein the pressure port has a first section with an outer circumference configured to mate with the inner circumference of a first section of the central opening of the housing to prevent relative rotation between the pressure port and the housing.

18. The pressure sensor of clam 17, wherein the pressure port is made of a high strength material and the housing is made of a lower strength material.

19. The pressure sensor of claim 18, wherein the high strength material is high strength stainless steel.

20. The pressure sensor of claim 19, wherein the lower strength material is aluminum.

21. The pressure sensor of claim 19, wherein the outer circumference of the first section of the pressure port and the inner circumference of the first section of the central opening of the housing have the same, non-circular shape.

22. The pressure sensor of claim 20, wherein the pressure port includes a shoulder and the housing has a first end, and the retaining ring bears on the shoulder of the pressure port and the first end of the housing.

23. A method of forming a high pressure sensor, comprising the steps of:
   forming a pressure port by machining the pressure port from a high strength material stock;
   forming a separate housing from a lower strength material, the housing having a central opening;
   inserting the pressure port through the central opening of the housing with a first section of the pressure port remaining within the central opening and a second section extending externally from the central opening and the housing; and
   rotationally and axially locking the pressure port to the housing, including biasing the pressure port axially with respect to the housing.

24. The method of claim 23, wherein the step of forming a pressure port includes machining a bore through the high strength material stock from a first end to a second end, leaving a thin diaphragm at the second end.

25. The method of claim 24, wherein the step of biasing includes inserting a flexed retaining ring bearing on the housing and the pressure port.

26. The method of claim 25, wherein the step of rotationally and axially locking includes fixing the retaining ring with a fixative.

27. The method of claim 26, wherein the steps of forming the pressure port and the separate housing includes forming an outer circumference of at least a portion of the first section of the pressure port with a non-circular shape, and an inner circumference of at least a portion of the housing with the same non-circular shape.

28. The method of claim 27, wherein the step of inserting the pressure port includes inserting the portion of the first section of the pressure port with the non-circular shape into the portion of the housing with the inner circumference with the same non-circular shape so as to rotationally lock the pressure port to the housing.

29. The method of claim 28, wherein the high strength material stock is stainless steel.

30. The method of claim 29, wherein the lower strength material is aluminum.

31. The method of claim 30, wherein high strength material stock is approximately 16 mm in diameter, and the machined pressure port is approximately 12 mm in diameter.

32. The method of claim 31, wherein the housing is between approximately 24 mm to approximately 27 mm.

* * * * *